(12) United States Patent
Wang (10) Patent No.: US 7,165,104 B2
(45) Date of Patent: Jan. 16, 2007

(54) METHOD AND APPARATUS FOR MANAGING COMPUTING DEVICES ON A NETWORK

(75) Inventor: Gang Wang, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 694 days.

(21) Appl. No.: 09/840,588

(22) Filed: Apr. 23, 2001

(65) Prior Publication Data

US 2003/0055948 A1    Mar. 20, 2003

(51) Int. Cl.
G06F 15/173    (2006.01)
(52) U.S. Cl. ............................ 709/224; 707/3; 707/10; 707/100
(58) Field of Classification Search ........ 709/223–226; 707/3–5, 10, 100
See application file for complete search history.

(56) References Cited

U.S. PATENT DOCUMENTS

| | | | | |
|---|---|---|---|---|
| 4,631,664 | A * | 12/1986 | Bachman | 707/100 |
| 5,655,081 | A * | 8/1997 | Bonnell et al. | 709/223 |
| 5,857,102 | A * | 1/1999 | McChesney et al. | 713/100 |
| 5,862,325 | A * | 1/1999 | Reed et al. | 709/201 |
| 6,105,066 | A * | 8/2000 | Hayes, Jr. | 709/226 |
| 6,128,016 | A * | 10/2000 | Coelho et al. | 709/223 |
| 6,148,335 | A * | 11/2000 | Haggard et al. | 709/224 |
| 6,226,788 | B1 * | 5/2001 | Schoening et al. | 709/203 |
| 6,438,616 | B1 * | 8/2002 | Callsen et al. | 719/316 |
| 6,502,088 | B1 * | 12/2002 | Gajda et al. | 707/10 |
| 6,510,435 | B1 * | 1/2003 | Bayer | 707/100 |
| 6,539,426 | B1 * | 3/2003 | Meek et al. | 709/223 |
| 6,721,747 | B1 * | 4/2004 | Lipkin | 707/10 |

OTHER PUBLICATIONS

Michael Maston, Microsoft Corporation, "Managing Windows with WMI", Nov. 1999, pp. 1-12.
David F. Ferraiolo, John F. Barkley, and D. Richard Kuhn, National Institute of Standards and Technology, "A Role-Based Access Control Model and Reference Implementation Within a Corporate Intranet", ACM Transactions on Information and System Security, vol. 2, No. 1, Feb. 1999, pp. 34-64.
Paul Haggerty and Krishnan Seetharaman, "The Benefits of CORBA-Based Network Management", Communications of the ACM, Oct. 1998, vol. 41, No. 10, pp. 73-79.
Emin Gun Sirer, Robert Grimm, Arthur J. Gregory, and Brian N. Bershad, University of Washington, Department of Computer Science and Engineering, "Design and implementation of a distributed virtual machine for networked computers", 17th ACM Symposium on Operating System Principles (SOSP '99), Published as *Operating Systems Review* 34(5), pp. 202-216, Dec. 1999.

(Continued)

Primary Examiner—Bunjob Jaroenchonwanit
Assistant Examiner—Victor Lesniewski
(74) Attorney, Agent, or Firm—Microsoft Corporation (57) ABSTRACT

Apparatus and method for configuring and monitoring multiple computers coupled to a network. A management computer includes software for monitoring multiple monitored computers such as server computers that are networked together on a network. The management computer includes an aggregator component that accumulates information regarding the multiple monitored computers. A video display displays a result from the aggregator component. Each of the monitored computers implement a schema for responding to queries by the aggregator component of the management computer by providing an access point to information about the monitored computer. In an exemplary embodiment of the invention the schema is implemented using WMI functionality of Windows 2000® which is a specific implementation of the Web-Based Enterprise Management protocol (WBEM).

3 Claims, 6 Drawing Sheets

OTHER PUBLICATIONS

Barron C. Housel [a], George Samaras [b], and David B. Lindquist [a], [a] IBM Corporation, [b] Department of Computer Science, University of Cyprus, "Web*Express*: A client/intercept based system for optimizing Web browsing in a wireless environment", Mobile Networks and Applications 3 (1998), pp. 419-431.

Dursun Delen, Perakath C. Benjamin, and Madhav Erraguntla, Knowledge Based Systems, Inc., "An Integrated Toolkit for Enterprise Modeling and Analysis", Proceedings of the 1999 Winter Simulation Conference, P.A. Farrington, H. B. Nembhard, D. T. Sturrock, and G. W. Evans, eds., pp. 289-297.

* cited by examiner

METHOD AND APPARATUS FOR MANAGING COMPUTING DEVICES ON A NETWORK

FIELD OF THE INVENTION

The present invention concerns a means of mapping and visualizing a network having multiple components in order to manage those components.

BACKGROUND ART

As computer networks have been put to greater use, the task of managing such networks has become more sophisticated. It is now common to network together a large number of server computers, sometimes referred to as server appliances. E-commerce companies build and maintain networks having perhaps thousands of computers in close proximity to each other (in a room perhaps) and rent computing capacity to a variety of users for a monthly fee. Companies that host World Wide Web sites, for example, buy or lease a large numbers of server computers that are coupled together by means of a local area network and provide high speed Internet access to all the server computers. One physical location with many computers can host many web sites having a wide variety of different purposes and degrees of sophistication.

Another example of a facility with large numbers of networked computers would be an information technology center of a business that uses the computers to run the business. The computing power of a main frame computer can be approximated by multiple networked computers. Each of the networked computers may perform different functions where in the past all of these functions were performed by a mainframe running individual jobs. Often the multiple networked computers can be just as effective in performing their computing function.

When multiple server computers are connected to multiple so called client computers, either by means of a local area network or a wide area network, the server computers must be managed or configured. The server computer must be configured in order for it to carry out certain tasks. Typically, the server performs a special function or task. For instance, a Web server only stores a set of web pages. Another server might only handle accounting functions etc. One given the task of administering the server logs on to the server (possibly remotely over a network) in order to configure and manage the server. As the number of server computers coupled together by means of a network increases, configuring the multiple server computers becomes more difficult. Prior art software is available which allows multiple 'clone' computers to be set up or configured based on the configuration of one other computer that is the model for configuring the multiple clones.

If each computer setup is unique and has its own requirements, the cloning process will not be of use since it cannot achieve the desired goal of individual setup and control over the multiple server computers coupled to the network. Instead a user will be forced to individually configure each of the server computers according to his or her network needs.

SUMMARY OF THE INVENTION

The present invention provides a method of monitoring and configuring computers or computing devices that are coupled to a computer network. The invention has application, for example, in monitoring events that occur on the computers coupled to a network. Typical events would include but not be limited to a start up and shutdown of the computer. Additional monitoring would include a performance of the computers as those computers perform various computing tasks.

An exemplary system for monitoring and configuring multiple computing devices includes a management computing device having software for monitoring multiple monitored computing devices that are coupled to a network. The management computing device or management node includes an aggregator component that accumulates information regarding the multiple monitored computing devices. A video display displays results gathered by the aggregator component.

Each of the multiple computing devices that are in communication with the management computing device by means of the network send information to the aggregator component of the management computing device. This communication is implemented by means of a schema which responds to requests for information from the aggregator component. The schema provides an access point to information about each of the monitored computing devices.

Use of a distributed schema allows the aggregator to determine the extent of management activity that is supported by each of the different computing nodes on the network. The distributed schema also allows the information to be discovered dynamically as the situation on each of the monitored nodes changes. By discovering and understanding the schema, the management computing device or node can aggregate operations performed over an entire network.

In an exemplary embodiment of the invention, the aggregator software component that runs on the management server node is responsible for understanding a client request, connecting to the nodes that the management server monitors, performing operations on multiple nodes by interacting with the schema stored on the nodes and sending a response to the client that has requested the information.

The single access point of the schema running on each of the computer nodes points to a class hierarchy. The access point leads to Web elements which are organized according to associations between Web elements. By first using the access point, the aggregator (on the management server) can traverse all web elements contained in a node and report to a user (client) a status of the nodes to which the aggregator has access.

Use of class instantiations and inheritance allow the functionality of the management server aggregator component to be extended by adding to or revising the schema stored at the network nodes. This ability to extend the capability becomes more important as more components are added to the network.

These and other objects, advantages and features of the invention will become better understood from the following detailed description of an exemplary embodiment of the invention which is described in conjunction with the accompanying drawings.

EXEMPLARY EMBODIMENT FOR PRACTICING THE INVENTION

Figure 1:
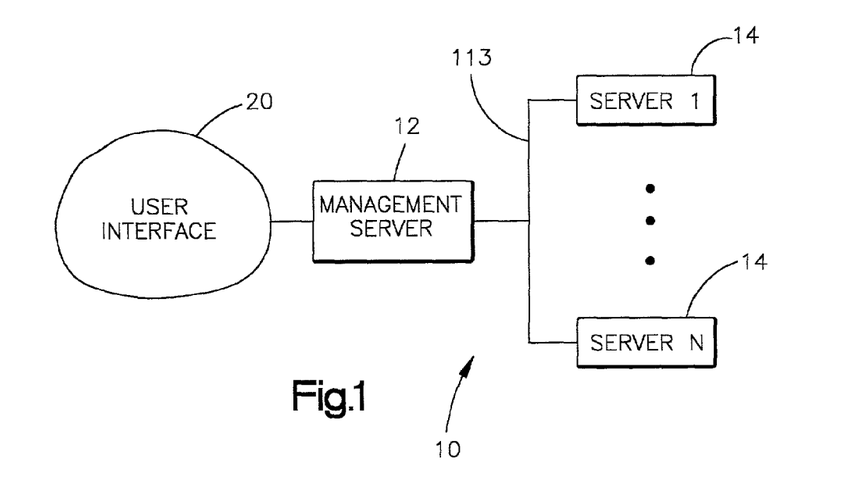
FIG. 1 is a representative network made up of multiple server computers.

Turning now to the drawings, FIG. 1 is a schematic depiction of a computer network 10 having a single management server 12 coupled to a number of other servers 14. In the following explanation it is assumed that the network 10 is a relatively small network that is often referred to as a local area network or LAN. Each of the servers 14 can, however, contain an interface to a wide area network such as the Internet and depending on the use to which the network 10 is designed, each of the servers 14 may include such an interface.

Figure 2:
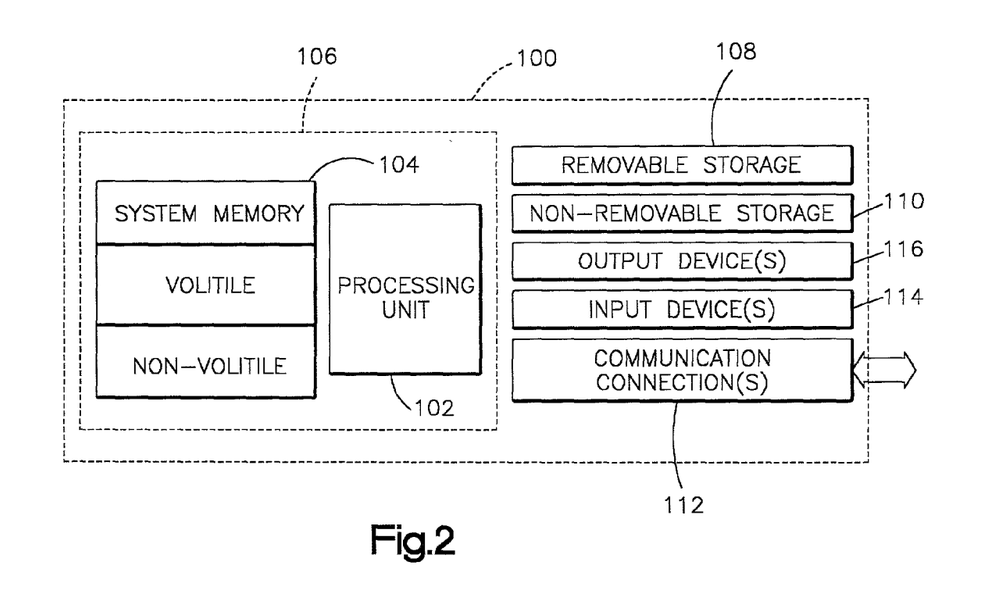
FIG. 2 is a schematic depiction of the components of a representative computing device coupled to the network shown in FIG. 1.

The network servers 14 and management server 12 each constitute a network node having a computing device 100 such as the computing device shown in FIG. 2. In the following description, the term server computing device, server computer, and server node are used interchangeably. A user interface 20 is implemented on a client computing device that interfaces with the management server 12 by means of the network 10.

The components of an exemplary computing device 100 are shown in FIG. 2. In its most basic configuration, the computing device 100 includes at least one processing unit 102 and memory 104. Depending on the exact configuration and type of computing device, the memory 104 may be volatile (such as RAM), non-volatile (such as ROM, flash memory, etc) or some combination of the two. This most basic configuration is illustrated as forming a module or component 106 of the FIG. 2 computing device.

Additionally the computing device 100 may also have additional features/functionality. For example, the computing device 100 may also include additional storage (removable and/or non-removable) including, but not limited to, magnetic or optical disks or tape. Such additional storage is illustrated in FIG. 1 by a removable storage 108 and a non-removable storage 110. The computer storage media includes volatile and non-volatile, removable and non-removable media implemented in any method or technology for storage of information such as computer readable instructions, data structures, program modules or other data. The system memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 100.

In order to communicate over the network 10 each computing device 100 contains a communications connection 112 that allows the device 100 to communicate with other devices on the network 10. As seen in FIG. 1, the communications connection 112 would allow the management server node 12 to communicate with other server nodes 14 over the network 10. The communications connection 112 includes an interface to a communications media. A communications media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communications media includes the physical layer of the hardware for carrying signals on wire media such as a wired network or wireless media such as acoustic, RF, infrared and other wireless media. Network links 113 between computing devices in the FIG. 1 network depiction are implemented using some or all of the aforementioned communications media. The term computer readable media as used in the present description includes both storage media and communications media.

The computing device 100 may also have input devices(s) 114 such as a keyboard, mouse, pen, voice input device, touch input device, etc. Output devices 116 such as a display, speakers, printers, etc may also be included. All these devices are well known in the art and need not be discussed at length herein. It is noted that the server 12 in FIG. 1 may be configured without a video display or keyboard input. In such a circumstance control functions and setup on the server 12 are performed by an interface to the server 12 available through one of the client computers which also are coupled to the network 10. When the network 10 is initially set up, special server software is installed on the server computers 14 and other networking software is installed on the client computers 14. Alternatively, the server computers 14 may be delivered from a vendor with all software installed and may only need to be configured. Such a computer is referred herein as a server appliance to be contrasted from a computer that is merely configured to act as a server due to the installation of software for performing server functions.

The server software provides a variety of features or functions. A network administrator responsible for maintaining the network 10 can reconfigure the servers 14 to provide the functionality and features needed to perform the requisite functions of the network. When the network is first installed, an operating system component is installed on each server 14 and, for example, a server appliance can include the Windows® 2000 operating system. A typical management scenario would involve a many server appliances networked together which form an Internet hosting business for providing computer power to a large number of customers.

Common Information Model

Windows® 2000 contains Windows Management Instrumentation (herein WMI) as a component. WMI is Microsoft Corporation's implementation and supporting infrastructure for the Common Information Model or 'CIM'. The Common Information Model or CIM is an object-oriented model that represents and organizes the information in a "managed environment." CIM objects can include, for example, computer systems, devices (like printers), controllers, files software, physical elements, people, organizations, networks, protocol endpoints, policy etc.

CIM also provides a definition of associations and methods. Associations describe relationships between objects—dependencies, component relationships (when an object is a component or part of a whole), connections etc. CIM defines a series of objects with respect to a basic set of classes and associations. One goal of the Distributed Management Task Force (DMTF), which publishes CIM, is to model all aspects of managed environments. By defining objects and their properties, methods and associates in a uniform manner, information from networks, devices, systems, and applications can be accessed more easily by management applications.

Figure 3:
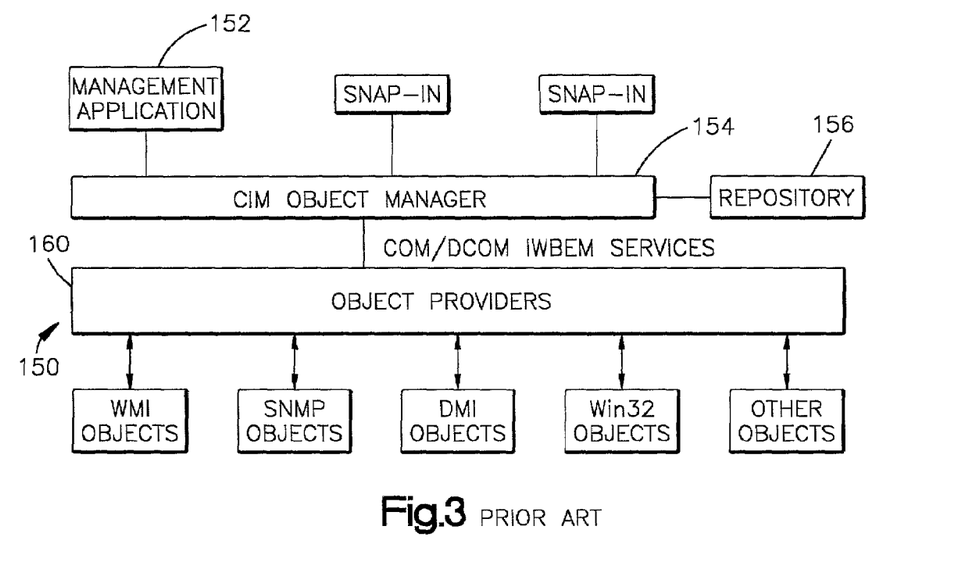
FIG. 3 is a prior art Common Interface Model (CIM) diagram showing communication between a management software component and multiple object providers which interact with the management software component by means of an object manager.

FIG. 3 is a prior art depiction of a Windows Management Instrumentation (WMI) implementation 150 that includes a management infrastructure for servicing one or more management applications 152. The management infrastructure includes a CIM object manager 154 and data or information stored in a WMI repository 156. In the windows operating environment, the functionality of the FIG. 3 management infrastructure is provided by an executable process designated WinMgmt.exe.

The CIM object manager 154 provides a collection and management point for objects and information stored in the repository 156. The CIM object manager facilitates gathering and manipulating information about managed objects. A communication path between management applications and an object provider 160 is supported by a IWbemServices COM/DCOM application provider interface or API. This API allows for object creation, deletion, data retrieval and more. It supplies event notification and query processing services, and can be accessed from several programming languages used to implement the management application 152.

The repository 156 is a central storage area for management data. It holds static management data and information on how to gather dynamic data. Data can be placed in the repository 156 by use of the Managed Object Format (MOF) language. Data in the WMI repository 156 is organized by schemas, which are loaded into "namespaces." A namespace provides a domain (or container) for a schema and for the instances of the classes that make up that schema.

Server Management

Figure 4:
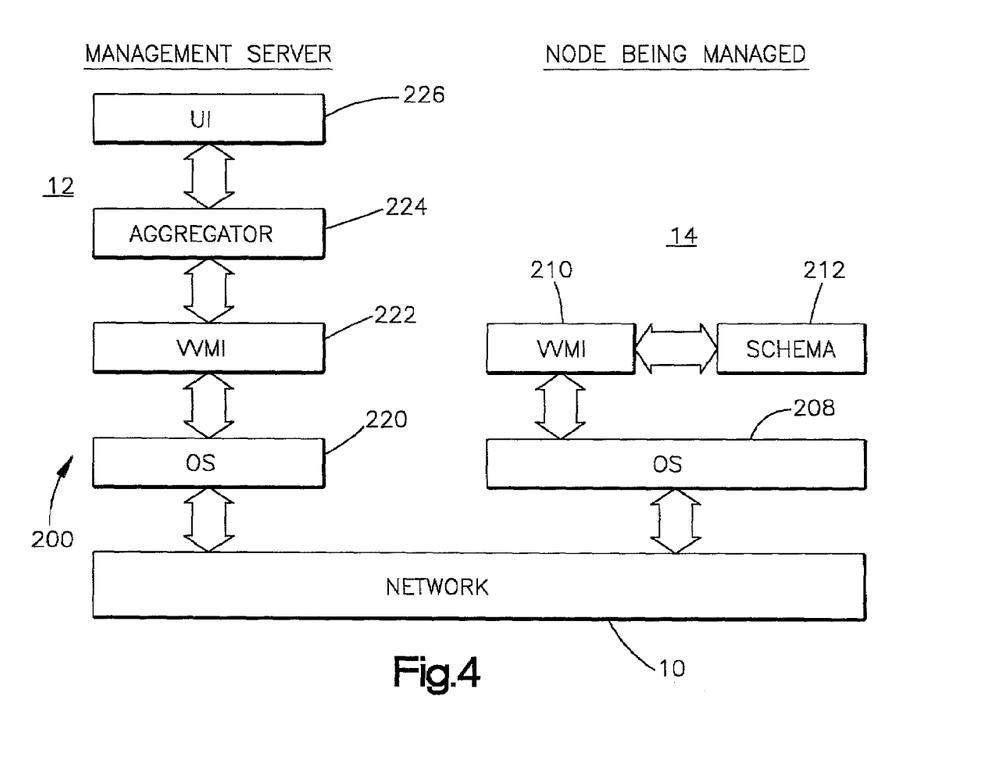
FIG. 4 is a model diagram showing an exemplary embodiment of the present invention showing an interface between a management server and a server appliance node on a local area network.

FIG. 4 depicts a three tiered model 200 showing software components communicating with each other by means of a network such as the network 10 of FIG. 1. The network is implemented using cabling or other physical hardware for connecting communications software running on various computing devices coupled to the network. The management server node 12 is coupled by means of a network 10 to a large number of appliance server nodes 14 only one of which is depicted in FIG. 4. In an E-commerce application, the number of server appliance nodes 14 can be many thousand, with multiple numbers of these server appliances installed in a server rack, all tightly spaced within the confines of a single room. Each server appliance node provides data storage and computing power for use by the E-commerce business utilizing those computers.

Each appliance server 14 contains an operating system 208 and in the preferred embodiment of the present invention the operating system is Windows® 2000 (server). Windows 2000® includes a WMI component 210. During installation of a typical server appliance, a schema 212 that is implemented in the managed object format (MOF) language is loaded into the computer or server appliance, compiled to create a data store on the WMI repository implemented for that server appliance.

The management server node 12 also contains an operating system 220 which in the preferred embodiment of the invention includes the Windows® 2000 operating system. This software also includes a WMI component 222. The WMI component 222 interfaces with an aggregator software component 224 that provides a user interface component 226. The user interface component sends information for display at a client computer to enable a user to manage and monitor multiple server nodes on the network 10.

The user interface 20 of FIG. 1 is a display on a client computer coupled to the management server node 12 by means of the network 10. Alternatively, a display terminal can be attached to the management server node 12 to provide a user interface 20 for managing multiple server nodes on the network. Typical user screens are depicted in FIGS. 7–10.

The aggregator component 224 is responsible for understanding a client request from the client on the network 10, performing multiple operations on the server appliance nodes 14, and accumulating responses from the various server nodes 14 coupled to the network 10. These responses are organized into a display for viewing by a client in a form such as the user interface discussed below.

No modification is needed to the WMI or operating system components of Windows® 2000. They provide security and transmit data over the network 10 between the server nodes 14 and the management server 12.

Management Schema

Figure 5:
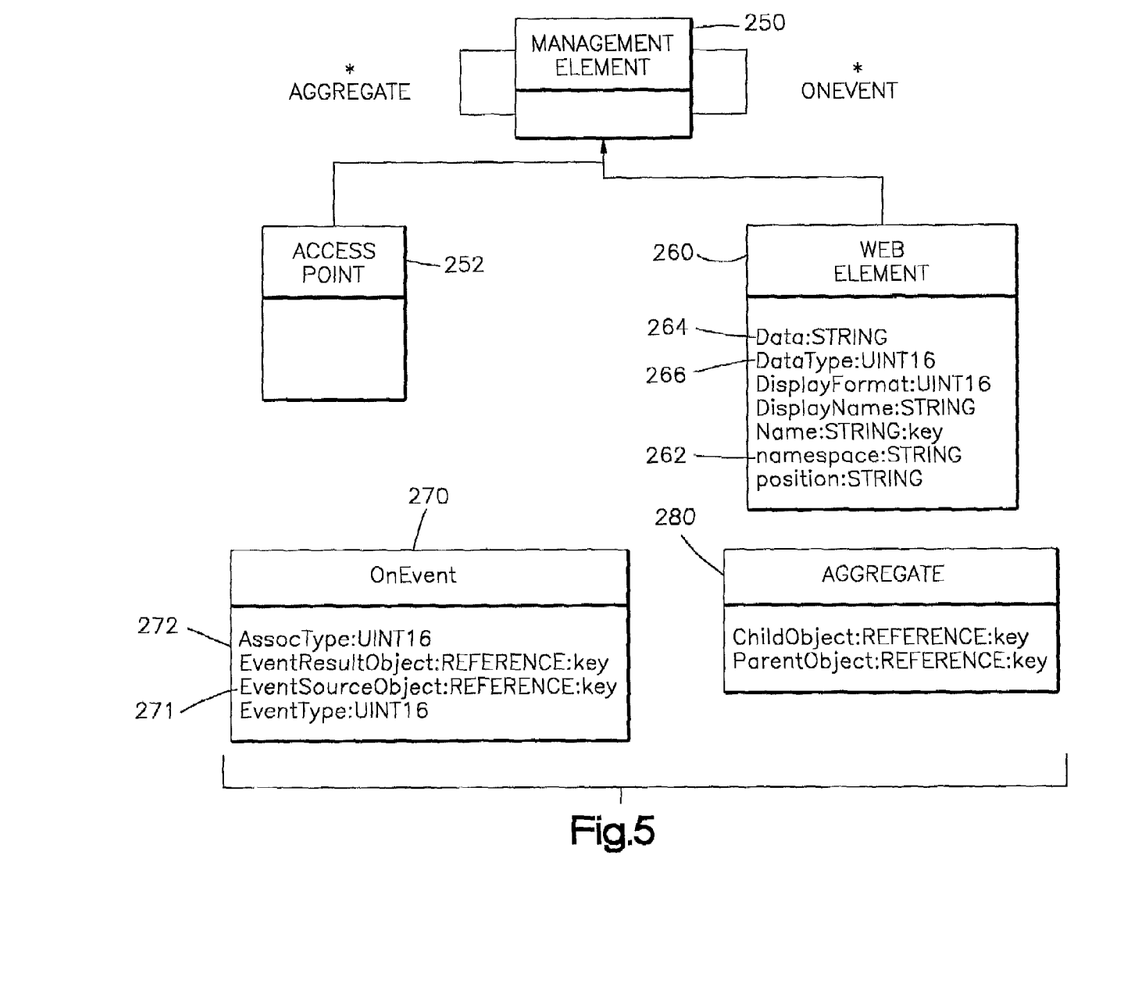
FIG. 5 is a schema model for managing a server computer node on a local area network.

FIG. 5 is a depiction of one implementation of a schema 212 which stores data within the WMI repository that is accessed during monitoring the status of the server nodes 14. The schema includes an abstract base class referred to in FIG. 5 as a management element 250. Each management element 250 has a single access point 252 which defines an entry point for accessing data related to each management element. All instantiated management elements that are monitored derive from the abstract base class 250, are instantiated within the repository of a server node and are exposed or become accessible by means of the access point 252.

Once the aggregator component 224 running on the management server 12 obtains a managed element by means of the access point 252, the aggregator 224 can query the managed element to determine the status of that element. Furthermore, the class structure shown in FIG. 5 can respond to events transmitted to the server from the aggregator 224 (by means of the network). Each web element can provide management data and respond to requests for information from the management server 12. Since the management element component of the schema is an abstract base class, it is not instantiated and instead, web elements 260 are defined which derive from the abstract base class of the management element. The web element 260 has properties that define a flexible management system allowing data to be accessed from the repository and displayed by the aggregator 224. Management data can be accessed in different ways and a namespace property 262 of the web element allows different access types to be distinguished. Two other properties, data 264 and date type 266, work together to define how the data should be accessed from the web element. The data property has data type of "string". It can be set to be a simple class name in which case the entire instance of a class will be retrieved. It can also be set to include query statements in which case the data type is of type 'SQL'.

Receipt of an onclick event causes the server appliance 14 to gather data and present that data to the aggregator 224 of the management server 12. When an onclick event occurs, the aggregator looks through the schema's onclick association instance to find a resulting object, initially an instance of a server appliance 14. The aggregator then gathers data concerning this object. A display format property of the web element is used to determine how the data should be presented to a client on the user interface. Display formats can be defined to be lists, tables, collections, etc.

Listing 1 is a managed object format (MOF) language description of higher level classes that make up the schema 212. This listing is written to be both machine and human readable.

---

Listing 1

---

```
#pragma namespace ("\\\\.\\root")
Instance of __Namespace
{
    Name = "sa";
};
#pragma namspace ("\\\\. \\root \\sa")
Instance of __Namespace
{
    Name = "Presentation";
};
#pragme namespace ("\\\\. \\root \\sa \\presentation")
class ManagementElement
{
};
class WebElement : ManagementElement
{
    [Key]
    string Name;
    string DisplayName;
    [Description ("valid input: 0 for table, 5 for property page")]
    uint16 DisplayFormat;
    string position;
    string namespace;
    uint16 DataType = 0;
    [Description ("data source. Valid input are SQL, classname")]
    string Data;
};
[singleton]
class AccessPoint : ManagementElement
{
};
[Association : toinstance]
class OnEvent
{
    [Description ("valid input: 0 for Onclick, 1 for OnRightClick,
    2 for mousover")]
    uint16 EventType;
    uint16 AssocType = 0;
    [key]
    ManagementElement ref EventSourceObject;
    [key]
    ManagementElement ref EventResultObject;
};
[Association : toinstance]
class Aggregate
{
    [key]
    ManagementElement ref ParentObject;
    [key]
    ManagementElement ref ChildObject;
};
```

---

Aggregator 224

The aggregator performs two main functions. It first acts as a schema interpreter. The schema design described in FIG. 5 is fully implemented in the aggregator. It knows how to interpret a given schema component. For instance if the WebElement class Data Type property is an SQL type query, the aggregator will get the SQL string from the data property and run it.

In the presently preferred embodiment of the invention, the query implementation is in WQL which is part of the WBEM query language. This is the type of SQL language used by WMI. When a WQL string is supplied, the aggregator will login to the specified namespace (a property of the web element) and run the WMI query on that server appliance. The aggregator also acts as a coordinator. When there are multiple nodes, the aggregator will connect to each node, perform an operation, synchronize the operation at the server side and then generate a unified and meaningful view based on the results of that operation to the client.

Figure 6:
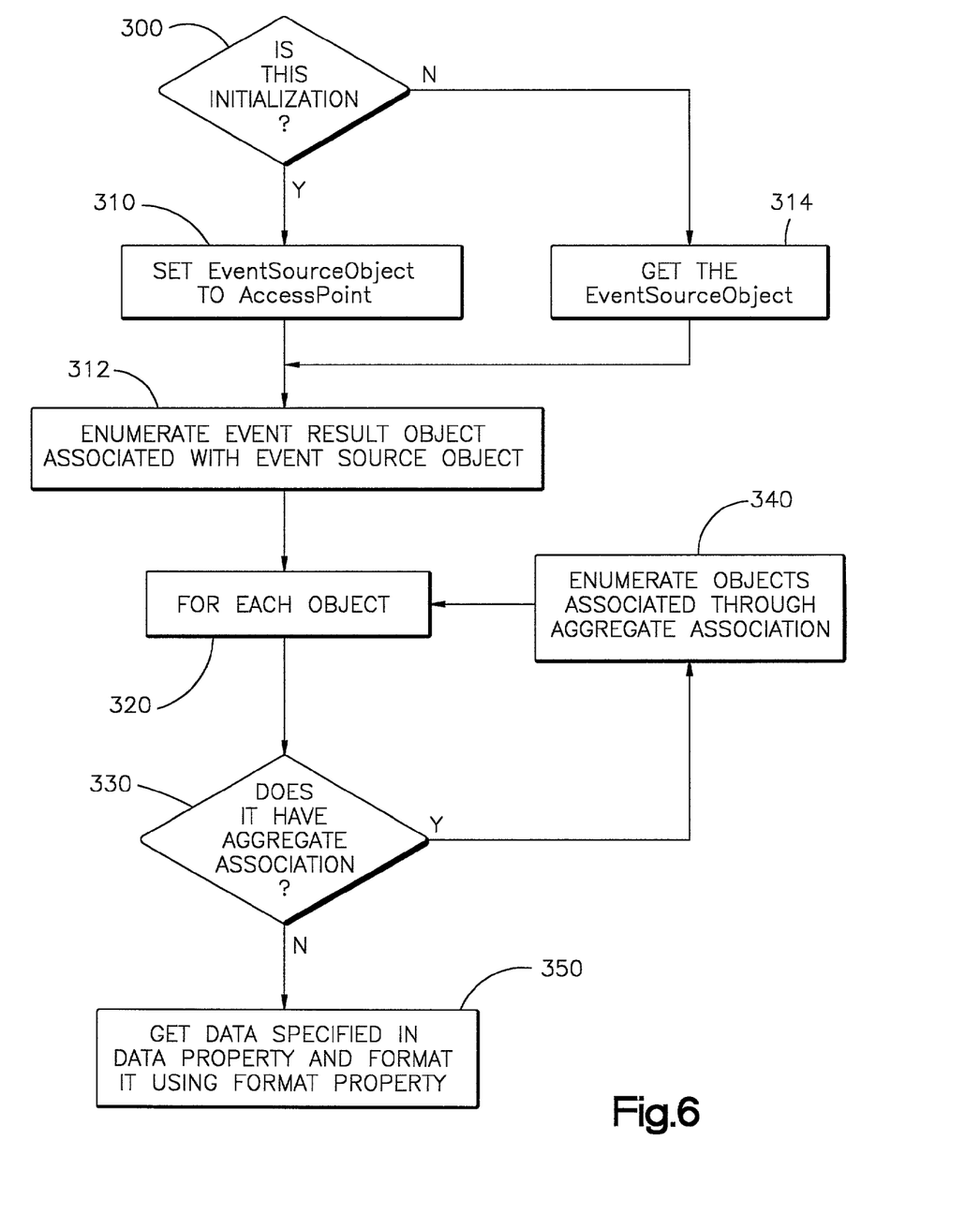
FIG. 6 is a flow chart showing a functionality of a management server that interfaces with the schema on multiple server nodes of a local area network.

FIG. 6 is a flow chart indicating how the aggregator 224 performs the operations on nodes. Initially, when the aggregator first connects to a node, nothing is know to the aggregator 224 except the AccessPoint instance 252 for the server appliance 14. From this instance, the aggregator can find out what WebElement is associated with the Access point through an instance of the OnEvent Class 270. The process of traversing a web element begins with a step 300 where the aggregator determines if this is an initialization step for the server appliance. If it is an initialization, the aggregator component of the server manager 12 sets 310 an EventSourceObject property 271 to the access point instance and then determines 312 the EventResultObject property 272 for this OnEvent object.

Once clients access the WebElement object, any operation performed on objects will be sent to the aggregator as an event along with a key to the object. From here, the aggregator can check for an OnEvent association that connects this object to other WebElement objects. All objects associated with that object will also be retrieved. For each object in this collection, the aggregator 224 examines that objects property settings. Based on the namespace, datatype and data property of the object, the aggregator will take an appropriate action. As an example the aggregator can connect to the right namespace, and run an SQL query or run a script that will instantiate the object.

As indicated in the flow chart of FIG. 6, the aggregator will also recursively check 330 for aggregate associations with other objects and retrieve those other associated objects. If there is an aggregate association the aggregator enumerates 340 those objects and recursively checks to see if the object itself has an aggregate association with other objects. Eventually the test 330 to determine if an aggregate association exits will fail and the aggregator performs the steps 350 of getting data and formating that data in conforming with the Data and DisplayFormat properties of the object. When determining the DisplayFormat, the container relationship as described in the Aggregate association is maintained so that a user will know that a given object is contained or forms part of another object. A properly formatted display form is sent to the user interface 20 and displayed to the one or more clients seeking information from the management server 12.

User Interface Example

Figure 7:
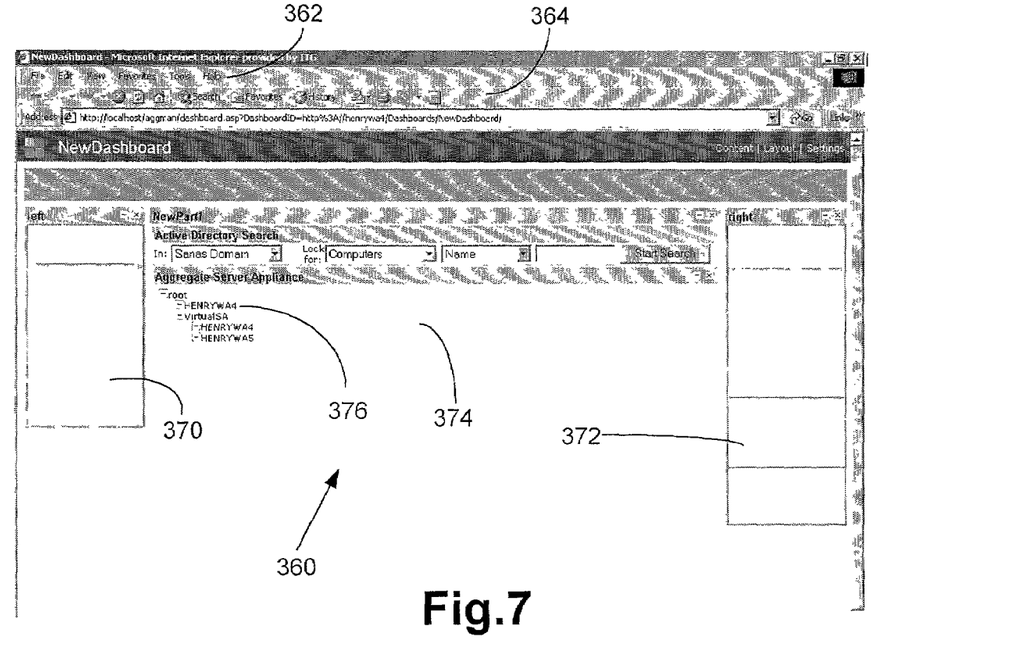
FIGS. 7–10 are representative visual display screens depicting a status of a network having a plurality of server appliances coupled to the network.

FIG. 7 is an example of a user interface screen 360 displayed on a client computer connected by means of the network 10 to the management server 12. The screen 360 is displayed by means of software running on the client and as an example such software may be commercially available browser software such as Internet Explorer® developed by the assignee of the present invention. In the exemplary implementation of the invention, the aggregator component 224 is implemented using Active Server Page (ASP) pages that are interpreted by software running on the management server 12. The client executes the browser software which in turn interacts with the aggregator component 224 of the management server 12 over the network 10. The screen 360 shown in FIG. 7 displays data that is sent to the client from the management server 12 and that is accumulated by the aggregator component 224 from the multiple server appliances 14 also coupled by means of the network 10 to the management server 12.

The screen depicted in FIG. 7 includes a menu bar 362 and a tool bar 364 which can be actuated by means of a mouse coupled to the client computer. Three windows 370, 372, 374, display information about the status of the multiple servers on the network 10. A left most window 370 has static menu items that includes clickable links for displaying different management data in the center window 374. The right most window 372 contains panels that include a summarization of the status of the network 10.

The center window 374 contains a hierarchical list of server appliances 14 contained on the network. This list is maintained by the management server 12 and a unique namespace is maintained by the management server for each server appliance 14 contained in the hierachical listing. More particularly the access point for each of the server appliances is know by the management server since it knows the unique namespace of that server appliance.

Consider what happens when the user clicks on a name "HENRYWA4" 376 in FIG. 7. The management server aggregator knows the access point for the schema for this server since it has the namespace in the form of ". . . //root//HENRYWA4". Using this information, the aggregator 224 uses the 'onEvent' instance having this accesspoint as the EventSourceObject WebElement to find the corresponding WebElement (EventResultObject) for the access point. This WebElement object is returned to the aggregator and used by the aggregator to update the client user interface screen 360 for which the 'onclick' event was initiated by the user.

Listing 2 below is an extension of the schema of listing 1 showing the class definitions for implementing the example interface screens shown in FIGS. 7–10. The MOF language of listing 2 is compiled and puts data in the WMI registry when the server appliance "HENRYWA4" is added to the network.

---
Listing 2
---

```
/*******************************************
Extending the schema
*******************************************/
/* access point */
instance of AccessPoint
{
};
/* from access point to a list of tasks */
class task: WebElement
{
};
instance of task
{
    name = "user";
    DisplayName = "User";
    DisplayFormat = 0;
};
instance of task
{
    name = "network";
```

---
Listing 2
-continued
---

```
    DisplayName = "Network";
    DisplayFormat = 0;
};
instance of task
{
    name = "Process";
    DisplayName = "Process";
    DisplayFormat = 0;
};
/* Tasks ref EventResultObject;*/
Class RootTasks : OnEvent
{
    AccessPoint ref EventSourceObject;
    TaskContainer ref EventResultObject;
};
instance of RootTasks
{
    EventSourceObject = "AccessPoint=@";
    EventResultObject = "TaskContainer.name=\"TaskContainer\"";
};
Class TaskContainer : WebElement
{
};
instance of TaskContainer
{
    name = "TaskContainer";
    DisplayName = "List of Tasks";
    DisplayFormat = 0;
    data = "select DisplayName from task";
};
/* from task to user */
class TaskToUserContainer : OnEvent
{
    Task ref EventSourceObject;
    UserContainer refEventResultObject;
};
class TaskToProcessContainer : OnEvent
{
    Task ref EventSourceObject;
    UserContainer refEventResultObject;
};
instance of ProcessContainer
{
    name = "ProcessContainer";
    DisplayName = "list of Process";
    DisplayFormat = 0;
    namespace = "root\\cimv2";
    data = "select Name from win32_process";
};
instance of TaskToUserContainer
{
    EventSourceObject = "task.name=\"user\"";
    EventResultObject = "UserContainer.name=\"UserContainer\"";
};
class UserContainer : WebElement
{
};
instance of UserContainer
{
    name = "UserContainer";
    DisplayName = "list of Users";
    DisplayFormat = 0;
};
class userlist : WebElement
{
};
instance of userlist
{
    name = "userlist";
    DisplayName = "list of Users";
    DisplayFormat = 0;
    Namespace = "root\\cimv2";
    Data = "select Name from win32_useraccount where doman=\
    "$localhost\"";
}
class UserContainerHas : Aggregate
{
```

-continued

Listing 2

```
    UserContainer ref Parent Object;
    Userlist ref, ChildObject;
};
instance of UserContainerHas
{
    ParentObject = "UserContainer.name=\"UserContainer\"";
    ChildObject = "userlist.name=\"userlist\"";
};
class UserToProperty : OnEvent
{
    userlist ref EventSourceObject;
    WebElement ref EventResultObject;
};
instance of WebElement
{
    name = "UserProperty";
    DisplayName = "User Property Page";
    DisplayFormat = 0;
};
instance of UserTo Property
{
    EventSourceObejct = "userlist.name=\"userlist\"";
    Event ResultObject = "WebElement.name=\"UserProperty\"";
    AssocTyipe = 1;
};
instance of Aggregate
{
    ParentObject = "WebElement.name=\"UserProperty\"";
    ChildObject = "WebElement.name=\"UserAccount\"";
};
instance of Aggregate
{
    ParentObject = "WebElement.name=\"UserProperty\"";
    ChildObject = "WebElement.name=\"UserDesktop\"";
};
instance of WebElement
{
    name = "UserAccount";
    DisplayName = "User Account";
    DisplayFormat = 5;
        Namespace = "root\\cimv2";
        Data = "select * from win32_useraccount where name=\
        "$SourceObj.name\" and
        Doman = \"$localhost\"";
};
instance of WebElement
{
    name = "UserDesktop";
    DisplayName = "User DeskTop";
    DisplayFormat 5;
        Namespace = "root\\cimv2";
        Data = "select * from win32_destop where
        Name = \$localhost\\\\$SourceObj.name\"";
};
//End of listing 2
```

Figure 8:
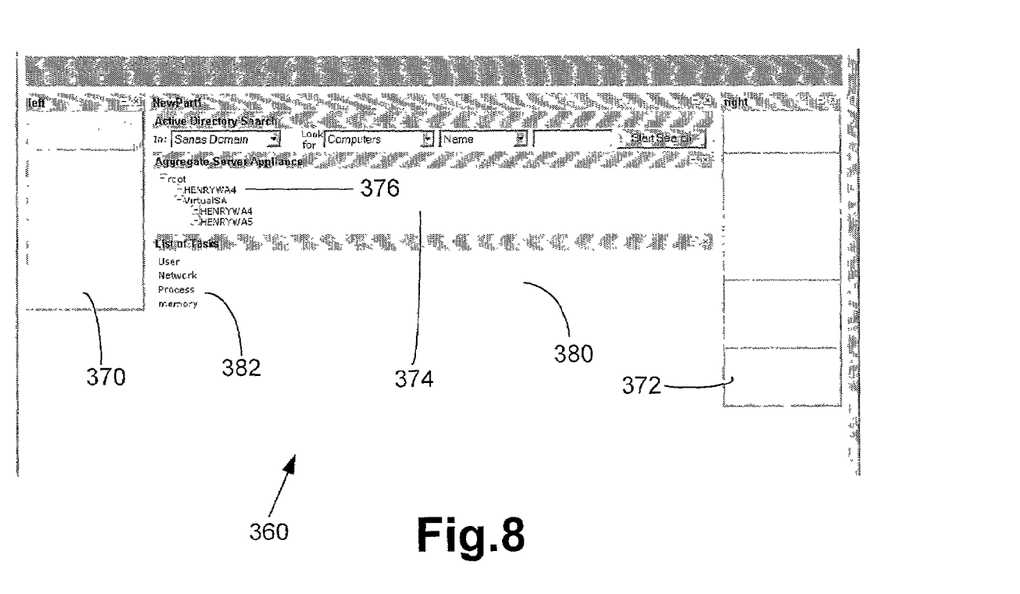

When the user clicks on the server name "HENRYWA4" depicted in FIG. 7, the aggregator responds by transmitting a screen that is shown in FIG. 8. Note at line 36 of the MOF listing of FIG. 2 there is an instance of type 'RootTasks' that has as its EventSourceObject an instance of accesspoint. Note, the accesspoint is a singleton class, so there is no need to give it a name.

The aggregator is returned an instance of type TaskContainer as the EventResultObject of this onEvent element of type TaskContainer. This instance is found at line 44 of Listing 2. The 'DisplayName' property for this WebElement is "List of Tasks". This is a heading seen in the window 380 in FIG. 8. The aggregator also is sent a data property as a string and this property is of type SQL. This causes the aggregator to execute the SQL statement on the managed element with the resultant task names of instances of type task returned to the aggregator and then displayed by the client browser. In FIG. 8 there is a list of four tasks (User, Network, Process, ;and memory) that are returned by the SQL statement and this list is displayed within the window 380.

Figure 9:
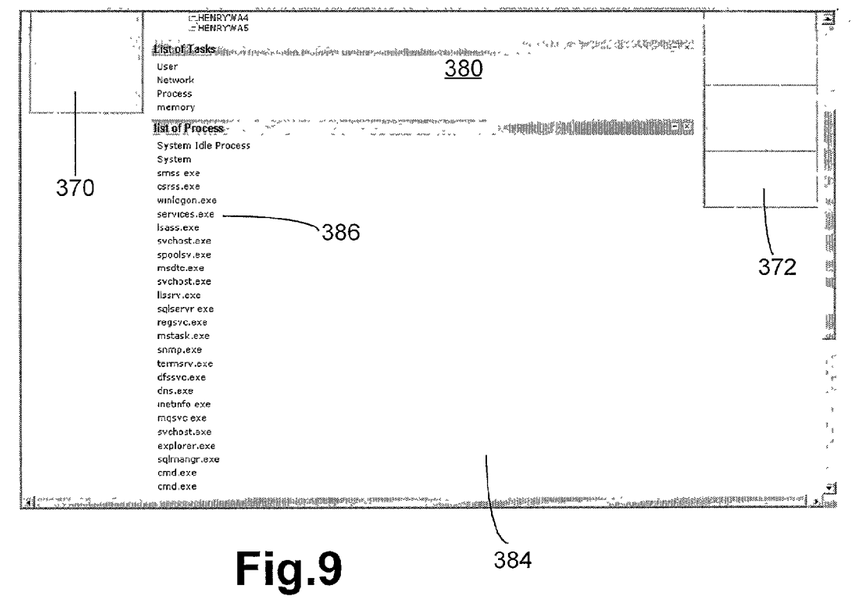
Figure 10:
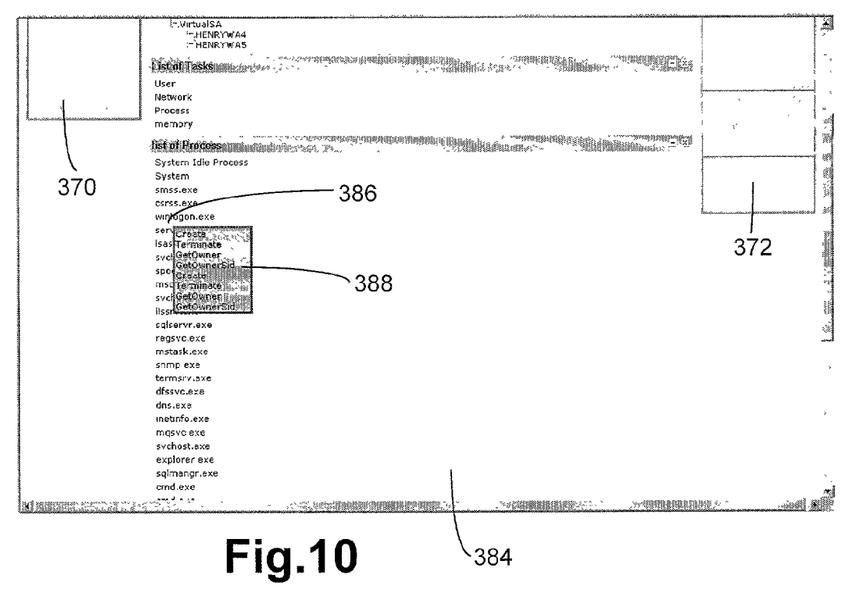

Now assume the user wishes to examine the processes running on the server appliance "HENRYWA4". By clicking on the "process" designation 382 in the window 380 the user is able to cause a list of processes running on the server appliance 14 to be displayed in the window 384 (FIG. 9). Note, to accomplish this the aggregator 224 accesses an instance of the onEvent class of type TasktoProcessContainer (line 57, listing 2) which returns an instance of a WebElement of type ProcessContainer (line 62, Listing 2) as the EventResultObject. This instance has a 'DisplayName' of "list of Process" which is displayed in the window 384. This instance also has an SQL statement as a string in its data property.

This string is found at line 68 of listing 2 as "select Name from win32_process". The Windows® 2000 implementation of WMI already supports a large number of classes for retrieving information about and working with a large number of objects. The Win32 classes are described in the WMI reference section of the Microsoft WMI SDK which is downloadable from Microsoft's web site. The SQL statement found at line 68 retrieves a collection of all the existing instances of the Win32_Process class on the designated server appliance (HENRYWA4) and returns those names to the aggregator.

This list is displayed in the window 384 shown in FIG. 9. If the user wishes to drill down even further, by right clicking on a particular process, the "services.exe" process 386, for example, the client browser displays a popup window 388 (FIG. 10) that lists the methods supported by this process.

The invention also can be used to configure a server appliance through use of the FIG. 5 schema. Returning to FIG. 8, a user at a client computer can click on the 'user' task in the window 380. This causes a list of users for the server appliance 14 to be displayed in the window 384. Note, to display this listing of users the aggregator 224 accesses an instance of the onEvent class of type TasktoUserContainer (line 70, listing 2) which returns an instance of a WebElement of type UserContainer (line 62, Listing 2) as the EventResultObject. The UserContainer WebElement contains a user list for the specified server appliance. The data item for the userlist is an SQL statement that obtains user accounts and displays a list of users in the window 384.

When a list of users is displayed in the window 384, a user at a client computer can click on any one of the users. An onEvent result allows the aggregator to access an instance of a UserToProperty and a user property page is displayed. From this display the client can modify the user property and save it. This process works as follows: The userToProperty instance links a user to a WebElement named "user Property", and this element is of type of aggregate class. This element contains two other web elements: "UserDeskTop" and "UserAccount". The display format for these two web elements is "5". This means the display format is a property page. Each field that is returned by the SQL statement is displayed in an edit box and a default "put" button is created also. The client user can then edit the value for each field and click the "put" button to save the entered data. This class structure and interaction between web elements is defined in the MOF of listing 2 at lines 110–150.

While a preferred embodiment of the present invention has been described with a degree of particularity, it is the intent that the invention include alterations and modifications from the disclosed design falling within the spirit or scope of the appended claims.

The invention claimed is:

1. A machine-readable storage medium having stored thereon a repository data structure for storing data corresponding to a schema for defining relations between objects of a server computing device coupled by means of a network to a management computing device, said repository data structure derived from a compilation of a managed object format language rendering of the schema, said rendering including:
   a) a base class of type management element from which a plurality of classes of type web element are derived, the base class of type management element providing at least one access point to instances of the derived classes, which can be traversed to dynamically discover information about one or more associated computing devices that satisfies one or more queries, based on one or more query triggering events defined in at least one on event class derived from the base class, the derived classes of type web element providing the information that satisfies the one or more queries;
   b) a first derived class of the base class being at least two managed elements having one or more attributes comprising a display format attribute defining a manner for presenting information at one or more client devices which is obtained by an aggregator component on the management computing device via the at least one access point and a display name attribute that identifies the information to be presented at the one or more client devices; and
   c) a second derived class of the base class being the at least one on event class that defines a source and result relationship between the at least two managed elements having at least one particular result object being provided for at least one particular source object based on the aggregator component requesting the information via the at least one access point.

2. The repository data structure stored on the machine-readable storage medium of claim 1 additionally comprising a third derived class of the base class being an aggregate class that defines elements having a parent and child relation between instances of the derived classes of type web element.

3. The repository data structure stored on the machine-readable storage medium of claim 1 wherein the first derived class further includes a datatype field and a data field and wherein one type of datatype causes the data in the data field to be interpreted as a SQL statement.

* * * * *